Sept. 29, 1964   P. A. GUINARD ETAL   3,150,684
DEVICE FOR THE DELIVERY OF A FLUID SUPPLIED BY A MOTORPUMP
Filed Oct. 5, 1962   4 Sheets-Sheet 1
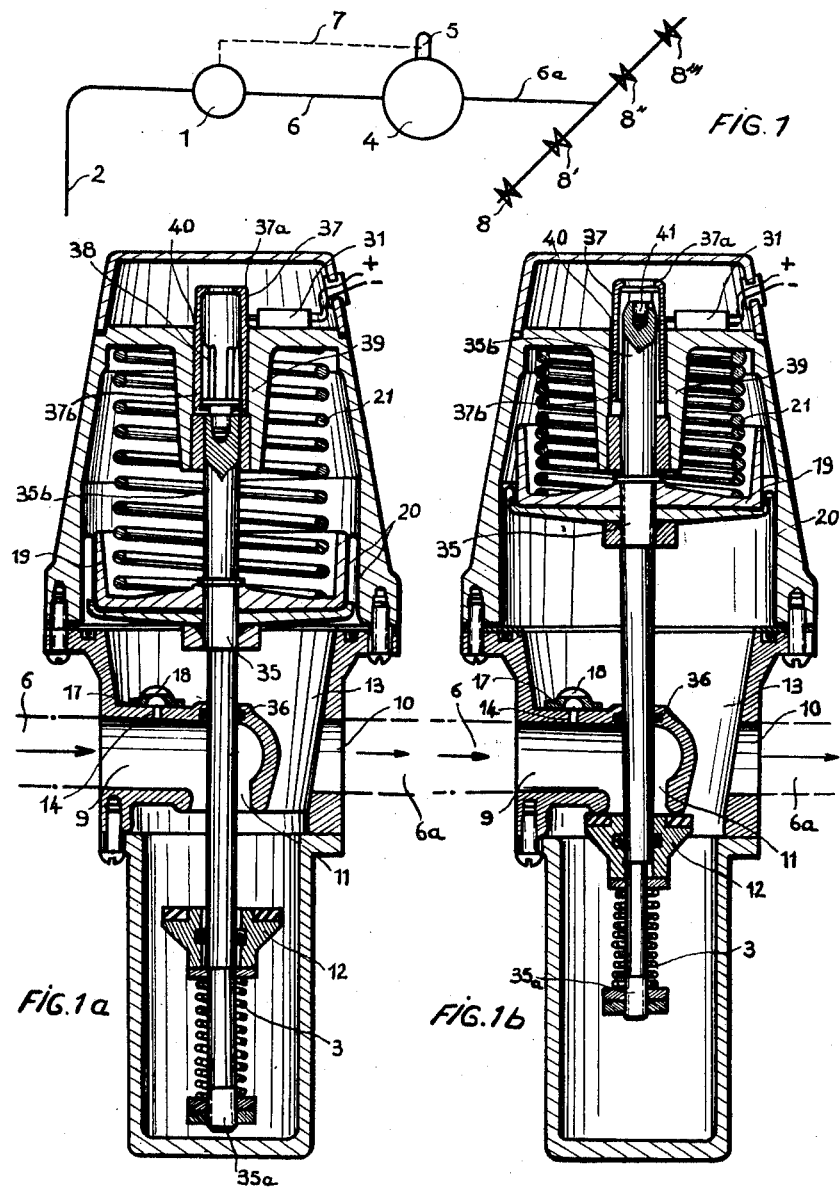
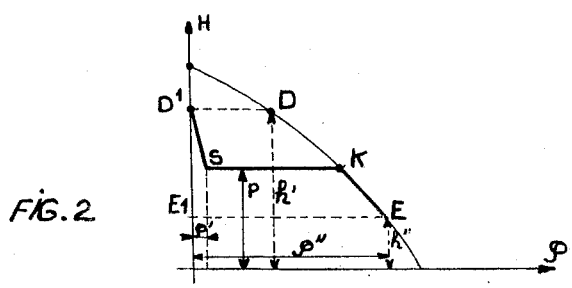

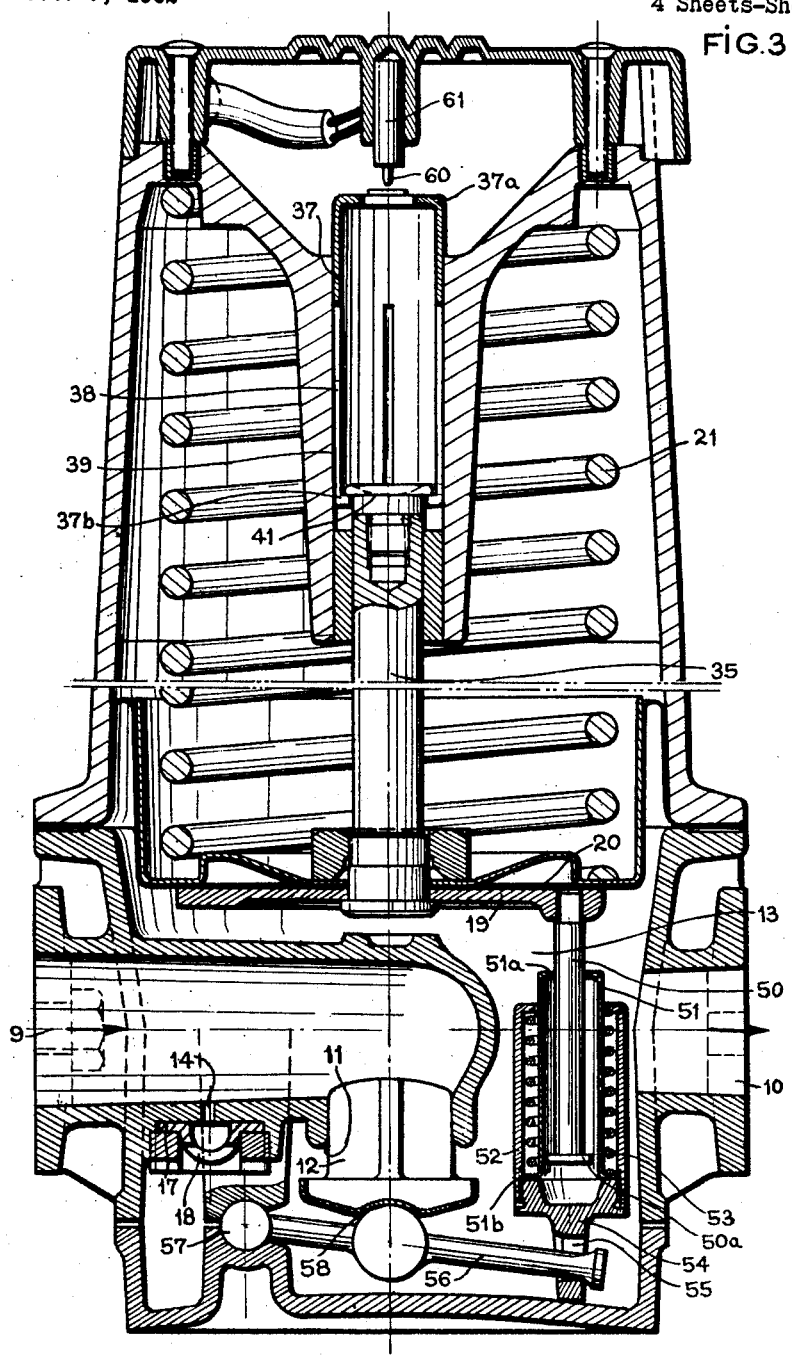

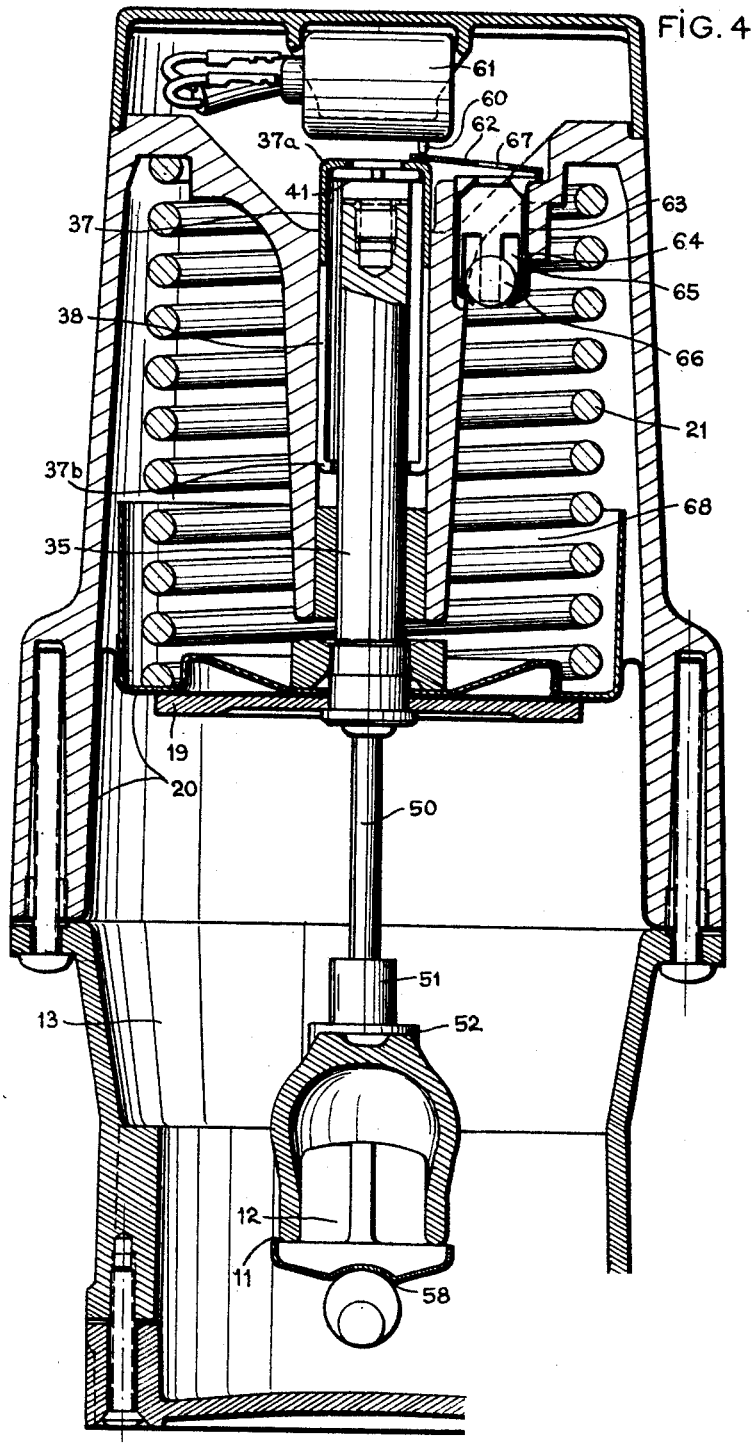

United States Patent Office 3,150,684
Patented Sept. 29, 1964

3,150,684
DEVICE FOR THE DELIVERY OF A FLUID
SUPPLIED BY A MOTORPUMP
Paul André Guinard, 6 Rue Montesquieu, Saint-Cloud, France, and Gérard Jean Georges Berger, Mercey, par Cheilly-les-Maranges, France
Filed Oct. 5, 1962, Ser. No. 228,719
Claims priority, application France, Oct. 6, 1961, 875,245; Sept. 11, 1962, 909,146
8 Claims. (Cl. 137—568)

This invention relates to improvements in devices for the delivery of fluid by a motorpump.

In a previous patent application No. 113,806, filed May 31, 1961, there was described an improvement in the plants for the delivery of a fluid and particularly of a liquid supplied by an electro-pump in which the starting and the stopping of the motor are controlled by a switch contactor operating as a consequence of the decrease or the increase of the pressure in the main discharge pipe of the pump at the opening or the closing of the supply cocks. According to the previous application, the device includes means to reduce the pressure operated by the flow of the liquid in the pipe to create at least a zone in which the pressure of the liquid remains fairly unchanging in a large range of the usual flow and varies suddenly when the flow becomes negligible the switch controlling the motor of the motor-pump being made responsive to the pressure prevailing in said zone.

According to an embodiment described in this previous application, the means intended to reduce the pressure is constituted by a pressure reducing valve comprising a chamber which communicates with the discharge of the pump and the pipe of the cocks, the inlet of the discharge pipe of the pump in said chamber being controlled by a valve operated by a piston movable in said chamber or by an elastic membrane subjected, on the one hand, to the water pressure prevailing in the chamber and, on the other hand, to the action of a spring or of a compressed air cushion.

The discharge of the pump directly communicates also with the chamber of the pressure reducing valve, upstream of said valve, by means of a calibrated orifice provided with a selector for the direction of flow which allows the flow of the liquid to take place only from the discharge of the pump to said chamber, with which is connected the main supply pipe. The pressure responsive switch controlling the starting and the stopping of the pump is operated by the piston or by the membrane, as a function of the pressure prevailing in the chamber of the reducing valve, said pressure being stabilized to a fairly constant value for all ranges of usual fluid deliveries. The calibrated selector for the flow secures the increase of the pressure in said chamber, between the moment when the pressure reducing valve is closed and the moment when contact of the switch is broken to stop the pump.

It is an object of the present invention to improve the operation of the above mentioned installation particularly in securing better conditions of constancy of pressure in a large range of deliveries by regulating the loss of head produced in the pressure reducing valve in proportion to the degree of opening of the supply cocks. The device according to the invention is characterized in that the valve member of the pressure reducing valve is supported on a stem which is integral with the piston or the elastic membrane. A spring is connected between the stem and the valve member to close the same when the piston or the membrane approaches the position in which it brings about the opening of the contact, thereby producing the stopping of the pump.

According to one embodiment, the valve is mounted to slide on an axial extension of the piston.

According to another embodiment of the invention, the valve is disengaged and it is biased by a lever loosely connected with a telescopic system having a spring connection with one face of the piston or of a backing plate of the membrane. The lever can be trunnion supported or have a ball joint connection at one end and preferably acts upon the valve member by means of a spherical bearing.

Another object of the invention consists in that the pressure responsive switch is controlled by the piston or the membrane of the pressure reducing valve by means of a push rod constituted by a frictionally movable tube and connected to the membrane or piston with a lost motion.

Another object of the invention consists in a safety device which actuates a micro-switch controlling the circuit of the motor of the electro-pump to automatically break this circuit, in case of a splitting of the membrane which separates the water reserve from the space containing the compressed air in the case of a breaking of the spring. The safety device is constituted by a float freely movable inside a tubular member which is frictionally mounted in a corresponding boring, the upper end of which can be obturated by the float in case of a splitting of the membrane. The assembly of the float and the tubular member is then moved under the action of the pressure to break the circuit of the motor.

By way of example, two forms of embodiment of the device, according to the invention, are described hereafter and illustrated in the annexed drawing, wherein FIGURE 1 diagrammatically shows a general arrangement of fluid supply apparatus.

FIGURES 1a and 1b show an axial elevation cross-section of an embodiment in which the various parts are illustrated, in the position of the opening of the switch and, in the position of the closing of the switch respectively.

FIGURE 2 is a curve of the flow quantity and the pressures, illustrating the operation of the device.

FIGURE 3 shows in elevation on an enlarged scale a longitudinal axial section of another embodiment of the invention, the various parts being shown in their positions at the closing of the circuit of the motor.

FIGURE 4 is an axial longitudinal section, perpendicular to the section shown in FIG. 3 with the various parts being shown in their positions at the opening of the circuit of the motor.

Figure 3A:
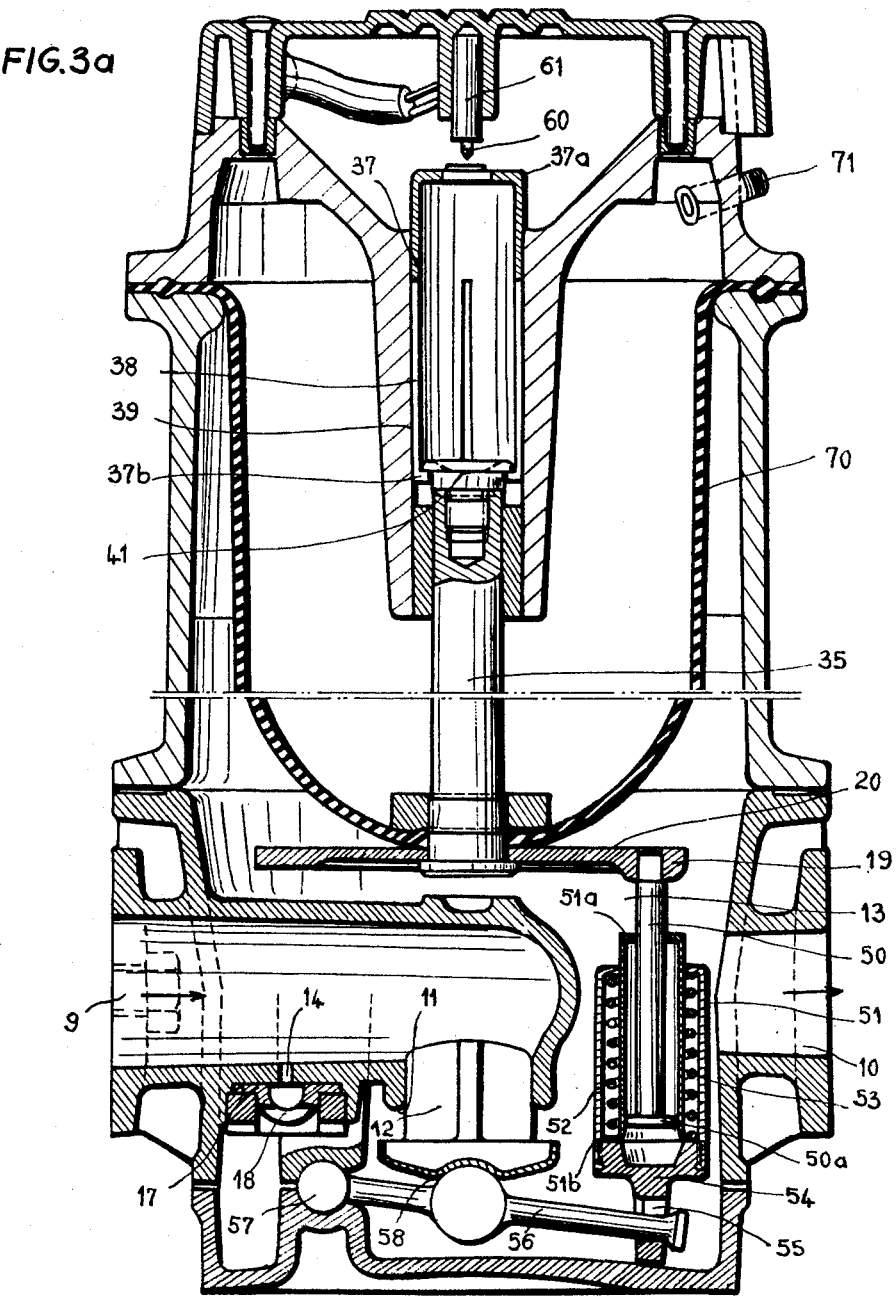
FIGURE 3a is a modification of the embodiment shown in FIG. 3.

The water supply plant shown in FIGURE 1 comprises an electro-pump 1 having a suction pipe 2 connected to a pressure reducing valve 4 provided with a pressure responsive switch, controlling the electric circuit 7 of the motor driving the pump 1. A pipe 6a connected to the outlet of valve 5 supplies water to cocks 8, 8', 8''.

The devices illustrated in FIGURES 1a, 1b, 3 and 4 are adapted for insertion in discharge pipe 6 of the motor-pump group, and include an inlet duct 9 for the fluid under pressure and an outlet 10 which is connected to the main supply pipe 6a. The inlet 9 and the outlet 10 can communicate through the aperture 11 which forms a seat for a valve member 12 in the chamber 13.

A selector for the direction of flow, constituted by a teat 17 which, is elastically deformable and has a slot 18 which establishes communication between the inlet duct 9 and the chamber 13 through a calibrated port 14 but prevents any flow of the liquid in the opposite direction.

The chamber 13 extends, at its upper part, in front of a backing plate 19 combined with a flexible or elastically deformable diaphragm 20. The plate 19 is subjected to the action of a spring 21 and is interconnected with a stem 35 which extends downwards and crosses the inlet duct 9 through a gasket 36. The valve member 12, in this embodiment is slidably supported on the portion 35a of stem 35 and, when the plate 19 is near or at its upper position, the valve member 12 is loaded by a weak spring 3.

The upper end 35b of the stem 35, the extreme positions of which (as functions of the positions of the plate 19) are respectively illustrated in FIGS. 1b and 1a, acts in its upper position to open the switch 31 of the circuit of the motor and, in lower position, to close this switch.

A tube 37, provided with several longitudinal partial slots 38 is frictionally mounted in a corresponding boring 39. This tube, in the embodiment in FIGS. 1a and 1b has an end with a reduced diameter and a shoulder 40 for acting upon the switch 31.

A screw with a projecting flange 41, mounted at the upper end of the stem 35, is engaged, due to the elasticity of the tube 37, inside said tube which has inner flanges 37a, 37b which cooperate with the flange 41 to drive said tube 37 with a lost motion, that is to say, only at the upper or lower end of the stroke of the backing plate or the membrane.

The diaphragm 20 divides the interior of the valve 4 into two separate compartments. In the compartment above the diaphragm 20 there may be provided compressed air.

The above described devices operate as follows:

At the closing of the supply cocks, the motor-pump is operative and remains operative for the short time necessary for the complete filling up of the chamber 13 and until the plate 19 reaches its upper extreme position which corresponds to the opening of the switch and thereby to the stopping of the motor-pump.

Immediately upon the opening of a supply cock, the pressure decreases rapidly in the chamber 13 and, simultaneously, the plate 19 moves down to its lower position, in which it brings about the closing of the circuit of the motor. The discharge pressure of the pump brings about the opening of the valve member 12 and the feed continues as long as the supply cocks are kept open. Simultaneously, the plate 19 is progressively lifted up to the moment when the spring 3 acts against the discharge pressure to bias the valve member 12 towards its closing position. This valve member 12 is then in a balanced position, creating a loss of head which is a function of the degree of opening of the supply cocks.

Between the moment of starting of the pump and the moment the action of the spring 3 on the valve member 12, the operation curve (see FIGURE 2) corresponds to the portion EK of the normal curve of the pump.

From the point K corresponding to the action of the spring 3 and thereby of the resulting loss of head, the pressure at the supply cocks remains fairly constant (pressure P) between points S and K, respectively corresponding to the flows Q' and Q", which corresponds to the range of normal utilization flows. During this entire period, the flow of the fluid through discharge outlet 9 towards the chamber 13 takes place, not only through the aperture 11 controlled by the valve member 12 but also through the calibrated boring and the slot 18 of the teat 17, the discharge of which, under the delivery pressure of the pump, is smaller than Q'. When the last supply cock is closed, this pressure rises rapidly to reach the value h' for which the plate 19 has been displaced to its upper maximum position corresponding to the opening of the circuit of the motor and thereby to the stopping of the electro-pump. This opening of the circuit corresponds to the point D1, while the closing occurs at a pressure h" (point E) or any intermediary point on the straight line E1-E.

In the case of a drop by drop leakage, it is necessary that all the water located below the plate 19, which initially is in its upper position at the stopping of the motor-pump group, flow away to allow subsequent starting.

In the embodiments in FIGURES 3 and 4 the elastic connection, with a lost motion, between the plate 19 and the valve member 12 is constituted by a stem 50, axially off-set, but connected with this plate at one end, the other end being provided with a flange 50A intended to cooperate with the top 51A of a tubular member 51, the lower edge of which is bent outwardly at 51B. This tubular member 51 can move inside another tubular member 52 by compressing a spring 53, to constitute a telescopic control. The tubular member 52 includes, at its lower end, a bottom 54 with an axial extension provided with a bore 55 which receives the end of a lever 56 hinged at 57. This lever is supported by a spherical bearing 58 on the valve member 12. In this embodiment, the micro-switch for the closing of the circuit of the motor is indicated by 61 and the push rod by 60, this part being actuated by means of a blade 62.

The safety device intended to stop the pump in case of a splitting of the membrane is constituted by a tubular member 63 frictionally mounted in a corresponding boring 64.

This member 63 includes longitudinal and partial slots 65, allowing thereby, on the one hand, the frictional mounting previously mentioned and, on the other hand, the introduction of a small spherical plug-float 66, able to obturate, in its upper position, a port 67, provided of the member 63.

In the case of a splitting of the membrane, the water under pressure flowing behind this membrane in the chamber 68 lifts the ball 66 which then obturates the port 67. The pressure existing in this chamber 68 moves the friction safety device constituted by the member 63, the ball 66 and the blade 62. This device, then, actuates, through the blade 62, the push 60 of the micro-switch 61 to open the circuit of the motor. As shown in FIG. 3a the spring loaded piston 19–21 may be replaced by a deformable elastic membrane 70 biased by compressed air introduced into the upper chamber of the valve body through a check-valve 71.

What is claimed is:

1. Apparatus for the delivery of a liquid including an electric motor, a pump driven by said motor, a pipe in which said pump discharges the liquid under pressure, supply cocks connected with said pipe, a pressure reducing valve connected with said pipe between the pump and the cocks and including a chamber with an opening connected to the pump, and a second opening connected to the pipe feeding the cocks, a movable control member mounted in sealed manner in said chamber and having one face subjected to the action of the pressure of the liquid prevailing in said chamber, elastic means acting upon the member in a direction against said pressure, an electric switch controlling starting and stopping of the motor of the pump and operatively supported with respect to said movable member to be actuated by said movable member, valve means for controlling communication between said chamber and the pump, means connecting with lost motion said valve means with the movable member in said chamber to open and close said communication as a function of the pressure prevailing in said chamber, said valve means including a valve member, a spring disposed to act upon said valve member in the direction to close communication between the pump and the chamber when the movable member approaches the position in which the switch is acted upon to stop the motor of the pump, a calibrated port providing direct communication upstream of the valve means, between the pump and the chamber of the pressure reducing valve, and a selector for the direction of the flow of liquid on said calibrated port to allow only the flow of liquid to the chamber from the pump through said port.

2. Apparatus according to claim 1, in which the movable control member in the chamber of the pressure reducing valve is constituted by a plate, the elastic means being a spring acting on said plate.

3. Apparatus according to claim 1, in which the movable control member in the chamber of the pressure reducing valve is constituted by an elastically deformable membrane separating said chamber into two compartments, one of which is adapted for communication with the pump and with the supply cocks, and the other is filled with compressed air.

4. Apparatus according to claim 1, wherein the movable control member in the chamber of the pressure reducing valve comprises a backing plate and deformable membrane peripherally secured to the backing plate and to the wall of said chamber.

5. Apparatus according to claim 1, wherein the chamber of the pressure reducing valve includes an inner pipe adapted for connection with the pump and provided with an opening forming a valve seat and opening downwards inside said chamber, said movable control member including an axial stem upon which is slidably mounted said valve member which is aligned with and is adapted for cooperating with said seat for controlling communication between the chamber and the pump, said means which connects the valve means with the movable member with lost motion comprising a stop on said stem and a spring mounted on the stem between said stop and said valve member for being compressed as the movable control member and said stem therewith moves towards said position in which the switch is acted upon.

6. Apparatus according to claim 1, wherein the chamber of the pressure reducing valve includes an inner pipe adapted for connecting with the pump and provided with an opening forming a valve seat and opening downwards inside said chamber, said valve member cooperating with said seat for controlling communication between the chamber and the pump, said means connecting the valve means with the movable member including a pivotally supported lever upon which said valve member is fixed, a vertical stem on the control member movable in the chamber of the pressure reducing valve, a cylindrical sleeve mounted on said stem and including at the lower end thereof an outwardly directed flange and at the upper end thereof an inwardly directed flange, a stop fixed upon the lower end of the stem to cooperate with said inner flange, a tube concentrically surrounding said sleeve and including at the upper end thereof an inwardly directed flange and at the lower end thereof an axial extension, means hingeably connecting the lever supporting the valve member with the axial extension, a spiral spring mounted between said sleeve and said tube and bearing against the inwardly directed upper flange of the sleeve and against the outwardly directed lower flange of the tube.

7. Apparatus according to claim 1, wherein the pressure reducing valve includes an upper wall provided with an axial bore, said control member including an axial stem guidably supported for movement in said bore, a sleeve concentric with said stem frictionally mounted in the bore above the stem and including an inwardly directed flange, said stem including a head cooperating with said flanges to move said sleeve in opposite directions in said bore in response to movement of the stem, said sleeve including an outer shoulder cooperating with the switch controlling the motor.

8. Apparatus according to claim 1, wherein the movable control member in the chamber of the pressure reducing valve comprises a plate and a deformable elastic membrane peripherally secured to said plate and to the wall of said chamber, said wall being provided with a vertical opening, a tube mounted in the vertical opening in the wall, said tube including a lower seat, a ball movably supported in said tube, and an elastic blade having one end secured to said wall above said opening and cooperating with said ball in case of a splitting of the deformable membrane to open the switch controlling the motor of the pump.

References Cited in the file of this patent
UNITED STATES PATENTS

| | | |
|---|---|---|
| 2,761,389 | Turner | Sept. 4, 1956 |
| 3,100,505 | Johnsen | Aug. 13, 1963 |